United States Patent [19]

Pendergrass, Jr.

[11] Patent Number: 5,325,721

[45] Date of Patent: Jul. 5, 1994

[54] SYSTEM FOR INDICATING EXPOSURE TO PRESELECTED TEMPERATURES OR TAMPERING

[75] Inventor: Daniel B. Pendergrass, Jr., Mendota Heights, Minn.

[73] Assignee: Minnesota Mining and Manufacturing Company, St. Paul, Minn.

[21] Appl. No.: 18,930

[22] Filed: Feb. 17, 1993

[51] Int. Cl.$^5$ .................. G01B 11/16; G01K 5/56; B32B 5/16
[52] U.S. Cl. ........................... 73/762; 428/327; 428/915; 116/216
[58] Field of Search ............... 73/762; 428/915, 327; 374/46, 162; 116/DIG. 34, 207, 216; 206/807; 220/214

[56] References Cited

U.S. PATENT DOCUMENTS

| | | | |
|---|---|---|---|
| 2,971,852 | 2/1961 | Schulein | 116/217 |
| 3,016,308 | 1/1962 | Macaulay | 503/200 |
| 3,469,439 | 9/1969 | Roberts et al. | 73/762 |
| 3,503,783 | 3/1970 | Evans | 428/277 |
| 3,896,965 | 7/1975 | Cornell | 220/359 |
| 4,058,434 | 11/1977 | Vincent et al. | 162/165 |
| 4,132,186 | 1/1979 | Manske et al. | 116/216 |
| 4,201,404 | 5/1980 | Charbonneau et al. | 503/208 |
| 4,457,252 | 7/1984 | Manske | 116/216 |
| 4,457,253 | 7/1984 | Manske | 116/216 |
| 4,654,256 | 3/1987 | Doree et al. | 428/327 |
| 4,945,705 | 8/1990 | Curiel | 53/411 |
| 4,988,557 | 1/1991 | Charbonneau | 428/204 |
| 4,998,989 | 3/1991 | Curiel | 215/250 |

FOREIGN PATENT DOCUMENTS

| | | |
|---|---|---|
| 161213 | 11/1985 | European Pat. Off. . |
| WO90/13420 | 11/1990 | PCT Int'l Appl. . |
| 2194062 | 2/1988 | United Kingdom ............ 73/762 |

OTHER PUBLICATIONS

Chemical Abstract 109: 110246M of Japan Kokai Tokkyo Koho JP 88 98,531; Apr. 30, 1988.

Primary Examiner—Hezron E. Williams
Assistant Examiner—Mort Smith
Attorney, Agent, or Firm—Gary L. Griswold; Walter N. Kirn; Dale A. Bjorkman

[57] ABSTRACT

Disclosed is a device for selectively indicating strain comprising a layer of polymeric binder and, distributed in or adjacent to the binder layer, microcapsules containing an indicating means, whereby when the binder is stiff, minor flexure of the device causes rupture of the microcapsules and releases the indicating means. This device has a non-stiff state such that a given strain applied to the binder layer in the non-stiff state will not release the indicating means, and a stiff state such that the same given strain applied to the binder layer in the stiff state will release the indicating means. Also disclosed is a method for determining exposure of an article to a given low temperature.

32 Claims, 1 Drawing Sheet

SYSTEM FOR INDICATING EXPOSURE TO PRESELECTED TEMPERATURES OR TAMPERING

FIELD OF THE INVENTION

The invention relates to a system useful for indicating that an article has been subjected to low temperatures at some point in its thermal history. This system may be used to monitor materials such as plants, foods, latex coatings, and other items which would be damaged by exposure to low temperatures. The system may also be used to indicate efforts to tamper with constructions which have been laminated, for which exposure to cold temperatures to delaminate the construction is one method of tampering. The invention also relates to a system to indicate tampering with constructions at any preselected temperature.

BACKGROUND OF THE INVENTION

Encapsulated materials have been used for many years in a wide variety of commercial applications. Early uses of encapsulated materials included paper coated with capsules bearing coloring material therein which could be used as a recording medium. U.S. Pat. No. 3,016,308 discloses one of the early efforts using encapsulated material as the image source on recording paper. U.S. Pat. Nos. 4,058,434 and 4,201,404 disclose other methods of application of encapsulated coloring materials on paper substrates to be used as imaging media and the like. U.S. Pat. No. 3,503,783 discloses microcapsules with a metal coating on the surface of the capsule, having coloring material therein which are rupturable by the application of heat, pressure and/or radiation. These rupturable microcapsules, in one embodiment, may be secured between a substrate and a photoconductive top coat to enable photosensitive imaging of the system.

Encapsulation technology has also been used to produce tamper-evident constructions. For example, Charbonneau discloses in U.S. Pat. No. 4,988,557 fragrance-releasing pull-apart sheets, which provide fragrance release upon separation. The sheets comprise microcapsules between two surfaces, with a discontinuous binder, the surfaces being adhered together by the binder. Patentees indicate that the capsule-bearing adhesive layer in their construction may be used as a security device for an article such as a coupon, lottery ticket or gaming card, in which, once the article has been opened and fragrance released, subsequent failure to release fragrance would alert any recipient to prior use and to the possibility of tampering. Additionally, Cornell discloses in U.S. Pat. No. 3,896,965 a tamper indicator tape for hermetically sealed containers having the aperture covered by a tape closure. The tape closure has on its outer surface an indicator layer which changes color when flexed, indicating whether the closure has been handled or tampered with. The indicator layer comprises binder resin, reactant materials and optional filler. The reactant materials comprise components that will react with one another to form a dye. One of these reactive components is encapsulated. The binder resin is selected to have a high enough tensile or Young's modulus that the force exerted to flex the closure tab upon opening will rupture the enclosed capsules. See column 2, lines 25-28.

SUMMARY OF THE INVENTION

The invention provides a device for selectively indicating strain comprising a layer of polymeric binder and, distributed in or adjacent to the binder layer, microcapsules containing an indicating means, whereby when the binder is stiff, minor flexure of the device causes rupture of the microcapsules and releases the indicating means. This device has a non-stiff state such that a given strain applied to the binder layer in the non-stiff state will not release the indicating means, and a stiff state such that the same given strain applied to the binder layer in the stiff state will release the indicating means.

In its simplest form, the indicating means is a latent two-part indicator system, with one half distributed in or adjacent to a layer of microcapsules filled with the second half of the indicator system.

The binder layer may achieve its stiff state either through exposure to temperatures below its "stiffening temperature," or through chemical or physical action on the binder matrix that increases its stiffness. The matrix is defined as stiff when minor flexure or elongation of the device tends to localize the stress at the microcapsules in the matrix, causing rupture of at least some of the capsules. The actual level of stiffness of the matrix does not necessarily correspond to an absolute modulus numerical value in the abstract, but rather is a function of the amount of strain that the device is expected to experience and the desired sensitivity of the device.

The stiffening temperature of the matrix is established through selection of binder material and optionally through further manipulations of the binder material to increase stiffness at the desired temperature. Most simply, the stiffening temperature of a polymer binder matrix is identified as its glass transition temperature. Using this technique, polymeric binder is selected having an extrapolated onset glass transition temperature that is slightly above the temperature at which indication is desired. Below the glass transition temperature, the matrix becomes stiff. When the device is flexed, the microcapsules in the matrix break, allowing the color forming reaction to occur.

The force that flexes the device may be provided through a temperature sensitive self-activation mechanism, such as a bilayer of materials having different coefficients of thermal expansion. This type of self-activating device will passively indicate exposure to a given low temperature. When the binder layer is flexed not from a self-activating device, but only on application of force from an outside force, the device is a tamper evident device.

Because the device as presented herein does not trigger the indicating means when the binder is in its non-stiff state, devices according to the present invention advantageously can be manipulated during manufacturing, transportation and the like in the non-stiff state without fear of premature triggering of the indicating means.

DETAILED DESCRIPTION OF THE INVENTION

The invention provides a device for indicating exposure to an external strain, to a given low temperature or to a strain only at a given low temperature. The invention further provides a method for indicating exposure of an article to an external strain, to a given low temperature or to a strain only at a given low temperature, comprising affixing said device or incorporating said device in an article.

When the invention is exposed to a temperature below the stiffening temperature of the matrix, tension or shear forces are no longer relieved by the comparatively elastomeric polymer binder matrix and capsules are ruptured. The indicating means contained within the microcapsules is then released. When the indicating means is a two part color former, for example, release of the components allows the two halves of the color former to mix and react either immediately or upon return to normal temperatures. The second component of the indicating means may be uniformly dispersed or distributed in the binder matrix or on a substrate to form an image or message upon reaction.

Binders useable in the invention include emulsion polymerized acrylates, solution polymerized acrylates, and tackified, anionically polymerized ABA block copolymers, isocyanate terminated prepolymers, and epoxy resins. Other common binders, e.g., urethanes, polyethers, and polyesters, could also be used. The major variables which can be tailored for each application are the desired $T_g$ of the polymer to select the temperature range at which capsule rupture becomes significant, the ability of the binder to adhere to the substrate and to the capsules so that stress may be concentrated at the capsule wall, and the absence of groups or diluents within the binder that would interfere with the imaging or other indicating system to be employed. These characteristics may be achieved by selection of polymers either individually or by blending various polymers to formulate an effective $T_g$, for the overall binder matrix and to achieve desired adhesiveness based on dispersion of functional groups on the polymer throughout the matrix. The binder matrix may also be rendered more sensitive to strain through incorporation of fillers. As a general rule, the more non-elastic filler that is present in the binder matrix, the more localized a strain is on the polymeric portion of the binder matrix. A highly filled matrix therefore tends to be more sensitive to strain. These parameters can be tailored for a given application by one of ordinary skill in the art with only routine experimentation. The binder for the microcapsules may be crosslinked after assembly to make solvent tampering more difficult, or to adjust the stiffening temperature upwards.

The stiffening temperature of the binder is selected to provide an adequate temperature above with indication does not occur, so that manipulations may be carried out without triggering the indication means. Devices according to the present invention that demark the stiff and non-stiff states by temperature alone will have binders that have a stiffening temperature that is less than about 110° C. This temperature allows for manipulation just above the boiling point of water and provides for selection of optimal polymeric materials having a $T_g$ within this range. Another preferred embodiment of the present invention comprises binders having a stiffening temperature below about 100° C., which is at the boiling point of water. Binders having a stiffening temperature of less than about 85° C., 5° C. and −40° C. are all also particularly preferred, because these temperatures are critical in the behavior of certain materials, and devices allowing manipulation above these temperatures and also indicate exposure or handling below these temperatures are deemed to have particular utility.

A particular advantage of the present invention is that the binder may be applied in a system that has a relatively low stiffening temperature so that initial manipulations may be performed on the device at ambient temperature without concern of triggering the indicating means. The stiffening temperature of the binder may optionally be adjusted before placement into the environment in which indication is desired or before indication is desired while already in the environment of use (e.g. attached to an article that is to be monitored for temperature or strain exposure) to increase the stiffening temperature of the binder. For example, the polymer in the binder may be crosslinked or may undergo a chain extension reaction by exposure to UV cure, E-beam, heat or chemical cure such as exposure of reactive polymeric binders, such as epoxy resins and isocyanate terminated prepolymers, to appropriate amine vapors or the like. Alternatively, the system may take advantage of aerobic or anaerobic cure mechanisms or other means of stiffening, such as loss of solvent (including materials that are traditionally referred to as plasticizers).

In the device, the binder may contain the first component of a two component indicator system, and the microcapsules contain the second component of the indicator system. Alternatively, the binder layer may contain both components of the two part indicator system, and the microcapsules contain a solvent for at least one of the components, so that upon rupturing of the microcapsules a sufficient amount of one component is solvated so as to produce the indication. It is also possible for one component of the system to be printed on a substrate that is kept in contact with the layer of binder and microcapsules during the period when indication is desired. A preferred embodiment is imagewise deposition of one or both components, so that the indication is a picture or image, e.g., words or a message, incorporating a visual contrast edge, thereby increasing ease of detection that the system has been activated.

Microcapsules useful in the present invention may be made by a wide variety of processes. These varied processes provide different techniques for producing capsules of varying sizes, alternative materials for the composition of the capsule shell and various different functional materials within the shell. Some of these various processes are shown in U.S. Pat. Nos. 3,516,846; 3,516,941; 3,778,383; 4,087,376; 4,089,802; 4,100,103 and 4,251,386 and British Patent Specification Nos. 1,156,725; 2,041,319 and 2,048,206. A wide variety of different materials may also be used in making the capsule shells. Popular materials for shell formation are the polymerization reaction products between urea and formaldehyde or melamine and formaldehyde, or the polycondensation products of monomeric or oligomeric polymers of dimethylolurea or methylolated urea with aldehydes. A variety of capsule forming materials are disclosed, for example, in U.S. Pat. Nos. 3,516,846 and 4,087,376 and U.K. Patent Specification Nos. 2,006,709 and 2,062,570. Preferred microcapsules may be found in Matson, U.S. Pat. No. 3,576,941, in particular, Example 20.

Certain constructions of the present invention may provide particular benefit in indicating tamper of articles under conditions of either heat or cold. Such constructions may comprise two separate mechanisms to indicate tamper, or may utilize the same microcapsules to release indicating means under either hot or cold conditions. For example, in devices of the present invention, microcapsules will be ruptured upon application of strain in cold conditions and with proper selection of the microencapsule shell, the shell wall will be thermally compromised (e.g.: soften, swell or melt to release the indicating means) at elevated temperatures. Microcapsules in which the active agent is contained within a thermoplastic core may be used to provide a heat developable system that reveals damage to the capsules only upon heating above the melting point of such cores.

Microcapsule size also plays a role in the sensitivity of the device by controlling the level of stress concentration seen by individual microcapsules and by controlling the amount of fill released per microcapsule ruptured. Shell wall modifiers may be used to influence the elongation to break for the shell.

The strain that triggers the indication means may be either tension or shear stress, and is provided either through self-activating means for applying force such as a bimetallic laminate or through a force imparted by an action that is external to the device. To provide effective indication of force below the identified temperature, the indication means should not be triggered by the same force when the force is applied above the identified temperature.

Strain may be applied to the binder layer by spanning the ends of a low coefficient of expansion member by a series coupled combination of the microcapsule containing matrix and a high coefficient of expansion member. For example, strain may be applied to the matrix by bonding one side to a rigid plastic having a low thermal coefficient of expansion and the opposite side of the matrix to a metal strip having a high coefficient of expansion. As long as the device is above the stiffening temperature, the shear forces will be dissipated by deformation of the matrix or by creep within the matrix. As the temperature drops below the stiffening temperature of the matrix, the differential motion between the plastic and the metal will create a shear force on the imbedded microcapsules causing at least some of them to rupture. Alternate constructions in which strain is applied by a bimetallic strip or coil are also possible. In particular, a bimetallic strip may be used to flex a device of this type as a cold exposure indicator which could be sealed inside a container.

Alternatively, one could utilize a thermally triggered, bipositionally stable device to indicate exposure of the device to a particular temperature. An example of such a device is an amusement device known as a "cricket" that is warmed (usually by frictional heating) and "popped" into a comparatively unstable configuration. Upon cooling the device, it reverts to its original configuration in a rapid manner. The "cricket" jumps from its place on a flat surface. In the present invention, the thermally triggered bipositionally stable device is coated with a microcapsule containing matrix as described herein, warmed and placed in its unstable configuration. Reversion to its original configuration on experiencing the lower temperature flexes the matrix and releases the indicating means.

Preferably, for reliable indications the matrix should be subjected to a force that gradually increases as the temperature is lowered.

It will be appreciated that the effective stiffening temperature of the binder depends on the rate of application of strain. For example, increasing the rate of application of strain is equivalent to lowering the ambient temperature of the device.

Rather than using a polymeric binder matrix, the matrix may be replaced by an enclosed fluid that has a freezing point at the desired temperature for indication. At least one indicator component is encapsulated, and the capsules are dispersed in the liquid. In this case, the second indicator component may be dispersed in the liquid phase. When the fluid freezes, it "stiffens", thereby localizing any strains experienced at the microcapsules. As the fluid thaws out, the first indicator component diffuses and is available to react with the second indicator component. The fluid must be chosen to avoid leaching of the encapsulated indicator by solvating the capsule shell wall.

When used in appropriate parts of a device, either very stiff or very compliant materials can delocalize stress experienced by the microcapsules to minimize incidental damage during handling. For example, a stiff cover film would tend to delocalize pressure from a point source such as a ballpoint pen. A thick, compliant layer would accomplish a similar result. Very compliant materials do not allow the local stress to build up because they stretch under very low mechanical loads.

The mechanical triggering event, which occurs below the stiffening temperature of the matrix, may include flexure, shear, peel, or overall elongation of the device. However, devices may be fabricated that also respond to peel and puncture well above the stiffening temperature. Such devices provide particular benefit in this art, because if one is concerned about tamper evidence in general, one may also be concerned about exposing the article to peel or puncture as well.

One preferred indicator system is a two-part color former, such as a leuco dye. Any two-part color former, such as those used in carbonless paper procedures, would be operational as the imaging chemistry in the invention. Such image formers include benzoyl leuco methylene blue, and carbazolyl blue. Also effective in the invention are fluorans such as monoaminofluoran and 2,6-diaminofluoran. All of these color forming compounds are known in the art, and may be obtained commercially or produced by methods known in the art. Alternatively, color-forming systems such as those relying on inorganic salt formation, such as nickel salt-dithio oxime complexes, or precipitation of solids, such as silver, are also operational in the invention. Color-forming systems may include a small amount of an agent in the matrix which reacts preferentially with the chemistry to form a colorless or background matching compound, to mask minor amounts of capsule rupture which may occur during fabrication of the device. Fillers or other porous particles could also be used to moderate image formation and spread.

As color formers, preferred are leuco dyes as used in carbonless copy paper, for example, crystal violet lactone, disclosed in U.S. Pat. No. 2,417,897. Suitable systems are disclosed in Petitpierre, "Dyestuffs and Chemicals for Carbonless Copy Paper", Ciba-Geigy Ltd., and, in Lange et al., U.S. Pat. No. 4,111,462.

Other operational imaging systems include the evolution of a gas which would form small, light scattering bubbles to opacify the construction where the gas is formed as a product of a reaction between an encapsulated component and an external component within or adjacent to the capsule binder layer or facilitated by a solvent released by the rupture of the capsules of the device, i.e., analogously to vesicular films. Another system involves the release of an oil to fill pre-existing voids in a film or texture in a surface to improve refractive index match, thereby rendering the construction more transparent. Further, additional "imaging" systems could include remote detection systems wherein the microcapsules contain, for example, freon gas, or another substance which is readily detectable by remote sensors. Typical fluorochemical taggants are disclosed in U.S. Pat. No. 4,399,226.

Color formation systems in which the two latent color formers are printed in offset registration, but not touching, or on opposite faces of a microencapsulated solvent containing binder layer may be imaged when the solvent is released (or after the system is reassembled if the solvent is sufficiently nonvolatile).

Yet another embodiment would comprise a multilayered construction in which layers containing the respective halves of the color forming system are separated by a solvent susceptible barrier layer which would be attacked by rupture of solvent containing microcapsules which could reside in any of these layers or in a separate layer of the device.

Another embodiment would include a first component of the latent imaging chemistry within the binder layer and a second component printed or coated on the adjacent substrate. Preferably, this first component is a solid of very low solubility in the carrier used to apply the capsule binder. This embodiment is activated by release of an encapsulated solvent that facilitates transfer of the first component to an area that it can react with the second component.

It is also possible that one component of the indicator system is contained in the device, with a second component of the indicator to be applied at a later time, even subsequent to rupture of the microcapsules, at which point the indication of exposure to strain is produced. This would allow delaying of the indication until it is desired to check whether the device has been exposed to low temperature, so that evidence of tampering is not immediately produced upon such tampering. For some constructions it will be desirable to further isolate the microcapsule containing layer from the external indicator component with a moderate barrier to the migration of the encapsulated material. This barrier separates, in time, the development of indicator from the triggering event and further reduces the likelihood of false indications of tampering. In such systems, indicator development may be accelerated by the addition of a solvent or swelling agent for the barrier.

Another format of the above embodiment would place one of the color formers on the opposite face of a porous substrate from the capsule binder layer such that the color formation is slowed and may be hidden from view.

An optional coating layer between the second color forming component on the substrate and the binder layer containing the first component could reduce the likelihood of premature imaging. An additional construction to fabricate could comprise a two component imaging system, each component of which is included within the binder layer in a form which precludes mutual contact prior to the release of a solvent from microcapsules also contained within the binder layer. This could be achieved as solid particles of the color forming chemistries, at least one of which is enclosed within solvent susceptible shells, applied, with a combination of the binder and solvent-filled microcapsules, from an aqueous system.

An example of a construction requiring tamper evidence is a photo identification, such as a driver's license or passport. These constructions are typically provided as laminate constructions using a pressure-sensitive adhesive, and are subject to tampering by delaminating the identification and substitution of the photo of another in the original document. A method of delaminating these documents often includes embrittling the construction to ease separation of the layers without damage to the substrate or the photograph. The constructions are then warmed and reassembled with no obvious indication that the document laminate has been altered. In constructions that additionally incorporate the microcapsule-containing matrix of the present invention, the separation of the layers to remove the photograph through attempts to embrittle the construction will trigger the indicating means.

The time-delayed indication discussed above has particular benefit where the perpetrator of the tampering immediately inspects the article following the tampering act, but does not check the article again until it is actually used. For example, a person falsifying identity records may not notice that the article is indicating tampering until presented to an official for fraudulent use.

Devices made in accordance with the present invention may also be used to enhance the effect of other tamper evident constructions. For example, food storage jars are generally are prepared with vacuum sealed covers. In preparation of products utilizing this technology, the jar is filled with product and heated. The jar is conventionally capped with a screw-top cover that is embossed with a button in the center. As the jar is cooled, a partial vacuum forms within the jar that causes the embossed portion of the lid to flex inward. When the jar is opened, the button in the center pops up as the vacuum is released, thus indicating breaking of the vacuum seal. The visual detectability of this seal release may be enhanced by coating the top of the container with a polymeric binder containing indicating means as described herein. The present invention allows the binder to be applied to the lid before the lid is applied to the jar, thus avoiding post-fill coating operations. In one aspect of the invention, the binder is applied to the lid and softens upon heating, thus allowing the lid to flex without triggering the indicator means. After the jar has cooled, the binder again becomes stiff and enhances seal release indication at temperatures below its stiffening temperature. In another aspect of the invention, the binder as applied to the lid initially contains a softening component such as a solvent or plasticizer that is dissipated upon heating or in storage. The binder thus becomes stiff after completion of all filling operations without undesired triggering of the indicating means. In yet another aspect of this invention, the binder is stiffened using a subsequent chemical reaction after the jar has cooled. Examples of such chemical stiffening steps include UV cure, E-beam, moisture cure, amine cures, oxidative cross-linking, and the like.

Appropriate selection of components described herein may provide a system which is able to indicate heat, cold, peel, cut and solvent tampering attempts.

BRIEF DESCRIPTION OF THE DRAWING

Various other objects, features and attendant advantages of the present invention will be more fully appreciated as the same becomes better understood when considered in conjunction with the accompanying drawing in which like numerals refer to like parts in the various views.

DETAILED DESCRIPTION OF THE DRAWINGS

Figure 1A:
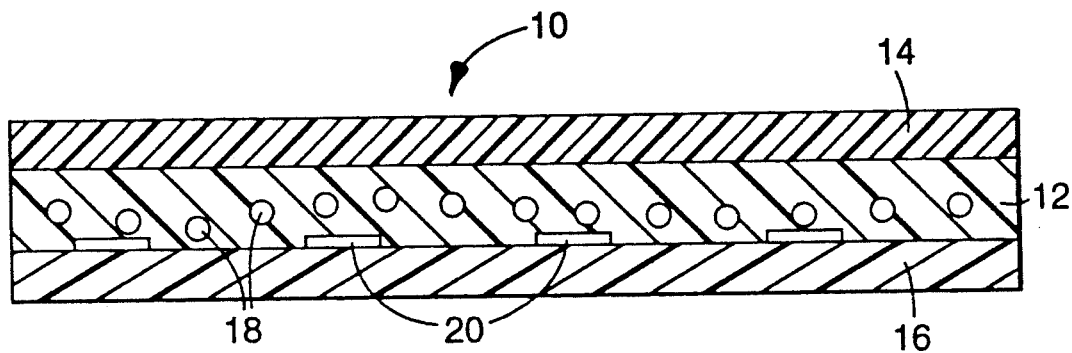
FIG. 1A shows an embodiment of the invention wherein a two-part color forming image chemistry is used.

Referring now to FIG. 1A, device 10 comprises binder layer 12, surrounded by film layers 14 and 16. Binder layer 12 contains microcapsules 18 containing one part of an image forming chemistry. The film layer 16 contains, e.g., printed thereon, a second portion of the color forming chemistry 20. Above the stiffening temperature of the binder, the microcapsules are cushioned from stress by the relatively rubbery matrix and therefore are difficult to break during normal handling of the device.

Figure 1B:
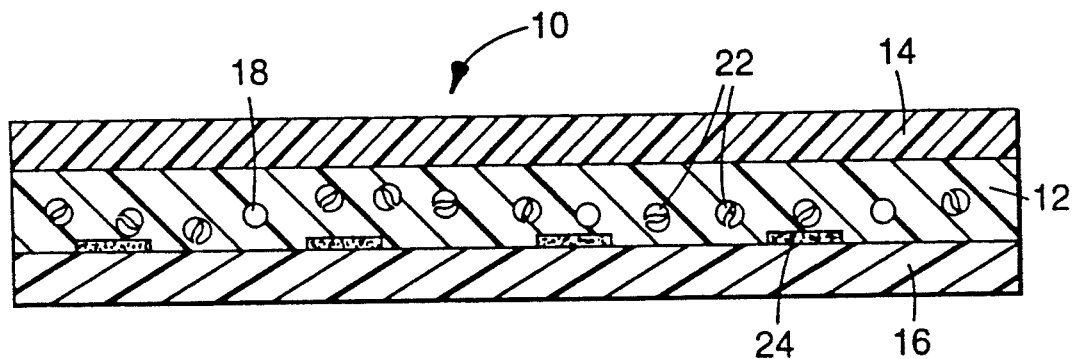
FIG. 1B shows the embodiment of FIG. 1A after microcapsules have been ruptured, so that the image has been formed.

FIG. 1B shows device 10 after microcapsules have been broken. Below the stiffening temperature of binder 12, microcapsules 18 become sites of stress concentration therein, and act as perforations in three dimensions. Under these conditions, broken capsules 22 release the portion of image forming chemistry contained therein, allowing an image 24 to be formed upon combination of the color chemistries.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

EXAMPLES

Example 1

A latent ink, dilute CF Offset Compound For CB Ribbon—34-7007-9775-5 a product of the Imaging Systems Division of 3M, is rubber stamp printed directly onto the adhesive surface of a piece of 3M #355 packaging tape. The adhesive face of a second piece of packaging tape is dipped into dry, carbonless microcapsules containing the second half of the color forming system. The powder is shaken around on the surface to ensure nearly complete monolayer coverage of the surface. This second tape is tapped sharply to remove any unattached microcapsules and then laminated, adhesive face to adhesive face, with the first piece of tape. The resulting construction is warmed to 100° F. for 20 minutes to improve the bond strength and to improve the clarity of the piece. Flexure, including folding, does not significantly image the piece, however, aggressive rubbing (sufficient to mechanically deform the tape backing) does produce a slight image locally. A piece approximately 1.5"×3" is cut from the sheet and placed in a container with the long dimension vertical. Following the addition of liquid nitrogen to the container, the piece is removed and allowed to return to room temperature. No intentional flattening or other manipulation of the sample took place. At room temperature, it is noted that about 25–30% of the sample has delaminated. The pieces are gently pressed back into contact and allowed to stand. Within two hours, a distinct image was visible and within 24 hours the full image intensity has developed.

EXAMPLE 2

Samples were fabricated and exposed to liquid nitrogen as in Example 1 and then stored at a variety of conditions to determine the effects on the rate of image development. It was determined that low storage temperatures inhibited image development after rupture of the capsules and gentle warming speeded the process. This reflects a reduced mobility of the released liquid fill through the binder matrix below $T_g$ (and to some extent freezing of the carrier liquid for the imaging chemistry) which behavior enables an imaging sequence in which the device is chilled, capsules are broken, but no significant development of the image occurs until after warming.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A device for selectively indicating strain, comprising a layer of polymeric binder that is stiff below a preselected stiffening temperature, and distributed in or adjacent to said binder layer, microcapsules containing an indicating means, whereby when the binder is stiff, minor flexure of the device causes rupture of the microcapsules and releases the indicating means, said device having a non-stiff state above the stiffening temperature of the binder such that a given strain applied to the binder layer in the non-stiff state will not release the indicating means and having a stiff state below the stiffening temperature of the binder such that the same given strain applied to the binder layer in the stiff state will release the indicating means, wherein the stiffening temperature of the binder is less than about 110° C.

2. The device according to claim 1, wherein the stiffening temperature of the binder is less than about 100° C.

3. The device according to claim 2, wherein the stiffening temperature of the binder is less than about 85° C.

4. The device according to claim 2, wherein the stiffening temperature of the binder is less than about 5° C.

5. The device according to claim 2, wherein the stiffening temperature of the binder is less than about −40° C.

6. The device according to claim 1, wherein the indicating means is a two-component indicator system.

7. The device according to claim 6, wherein the two-component indicator system is a two-part color former.

8. The device according to claim 6, wherein the first component of the indicator system is dispersed in the binder layer, and the second component of the indicator system is disposed within the microcapsules.

9. The device according to claim 7, wherein the binder layer contains both components of the two-part color former, and a solvent capable of solvating at least one of the color formers is disposed within the microcapsules, whereby rupturing the microcapsules solvates a sufficient amount of said color former to produce a color.

10. The device according to claim 7, wherein the binder layer containing microcapsules is laminated on a substrate, and wherein one of the color former components is coated on the substrate.

11. The device according to claim 1, wherein the indicating means is a two-component indication system wherein the first component is contained within the device, and the second component is remote from the device and may be applied to the device at a later time.

12. The device according to claim 1, wherein the microcapsules are of a thermoplastic material such that the integrity of the shell is thermally compromised at a predetermined temperature above the stiffening temperature, whereby heating of the device also releases the indicating means.

13. The device according to claim 1, further comprising self-activating means for applying strain to the binder layer, such that when the temperature of the device is below the stiffening temperature of the binder, the self-activating means for applying strain imparts sufficient strain that the microcapsules are ruptured.

14. The device according to claim 2, further comprising self-activating means for applying strain to the binder layer, such that when the temperature of the device is below the stiffening temperature of the binder, the self-activating means for applying strain imparts sufficient strain that the microcapsules are ruptured.

15. The device according to claim 3, further comprising self-activating means for applying strain to the binder layer, such that when the temperature of the device is below the stiffening temperature of the binder, the self-activating means for applying strain imparts sufficient strain that the microcapsules are ruptured.

16. The device according to claim 4, further comprising self-activating means for applying strain to the binder layer, such that when the temperature of the device is below the stiffening temperature of the binder, the self-activating means for applying strain imparts sufficient strain that the microcapsules are ruptured.

17. The device according to claim 5, further comprising self-activating means for applying strain to the binder layer, such that when the temperature of the device is below the stiffening temperature of the binder, the self-activating means for applying strain imparts sufficient strain that the microcapsules are ruptured.

18. The device according to claim 13, wherein the means for applying strain comprises two materials having different coefficients of thermal expansion, whereby the device flexes when the device experiences a change in temperature over a predetermined range.

19. The device according to claim 13, wherein the means for applying strain is a bimetallic strip in intimate contact with said binder layer.

20. A device for selectively indicating strain, comprising a layer of polymeric binder that may be made stiff by crosslinking, and distributed in or adjacent to said binder layer, microcapsules containing an indicating means, whereby when the binder is stiff, minor flexure of the device causes rupture of the microcapsules and releases the indicating means, said device having a non-stiff state before crosslinking of the binder wherein a given strain applied to the binder layer will not release the indicating means and a stiff state after crosslinking of the binder wherein the same strain will release the indicating means.

21. The device of claim 20, wherein said binder is crosslinked through exposure to UV radiation.

22. The device of claim 21, wherein said binder is crosslinked through exposure to E-beam radiation.

23. The device of claim 21, wherein said binder is crosslinked through exposure to heat.

24. A device for selectively indicating strain, comprising a layer of polymeric binder that may be made stiff by loss of solvent from the binder, and distributed in or adjacent to said binder layer, microcapsules containing an indicating means, whereby when the binder is stiff, minor flexure of the device causes rupture of the microcapsules and releases the indicating means, said device having a non-stiff state before loss of solvent from the binder wherein a given strain applied to the binder layer will not release the indicating means and a stiff state after loss of solvent from the binder wherein the same strain will release the indicating means.

25. A method for determining exposure of an article to a temperature less than 110° C., comprising affixing to said article a device according to claim 13.

26. A method for determining exposure of an article to a temperature less than 100° C., comprising affixing to said article a device according to claim 14.

27. A method for determining exposure of an article to a temperature less than 85° C., comprising affixing to said article a device according to claim 15.

28. A method for determining exposure of an article to a temperature less than 5° C., comprising affixing to said article a device according to claim 16.

29. A method for determining exposure of an article to a temperature less than about −40° C., comprising affixing to said article a device according to claim 17.

30. A method according to claim 25, wherein the microcapsules are of a thermoplastic material such that the integrity of the shell is thermally compromised at a predetermined temperature above the stiffening temperature, whereby heating of the device also releases the indicating means.

31. A method for detecting tampering by embrittling and delaminating of a laminated article, comprising including in said article a layer of polymeric binder having a stiffening temperature, and distributed in or adjacent to said binder layer, microcapsules containing an indicating means, whereby when the binder is stiff, minor flexure of the device causes rupture of the microcapsules and releases the indicating means, said device having a non-stiff state above the stiffening temperature of the binder such that a given strain applied to the binder layer in the non-stiff state will not release the indicating means and having a stiff state below the stiffening temperature of the binder such that the same given strain applied to the binder layer in the stiff state will release the indicating means, wherein the stiffening temperature of the binder is less than about 5° C.

32. The method of claim 31, wherein the stiffening temperature of the binder is less than about −40° C.

* * * * *